March 3, 1970  R. A. LARROWE ET AL  3,498,462
FLOW NOZZLE ASSEMBLY FOR UPFLOW FILTERS
Filed May 14, 1969  3 Sheets-Sheet 1
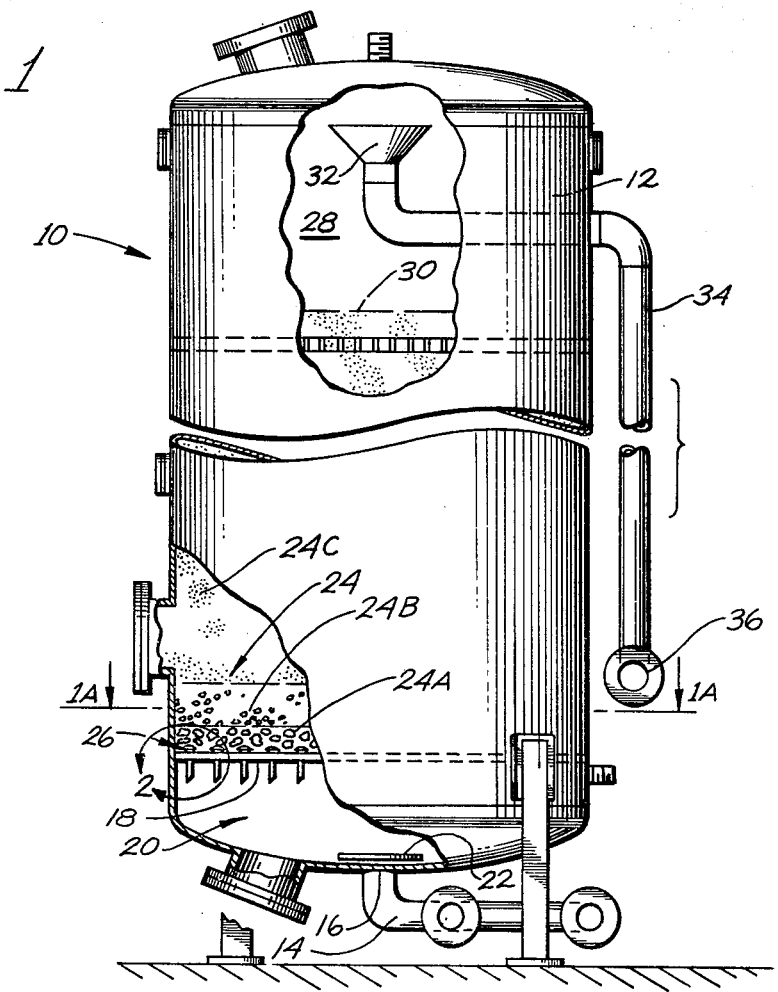
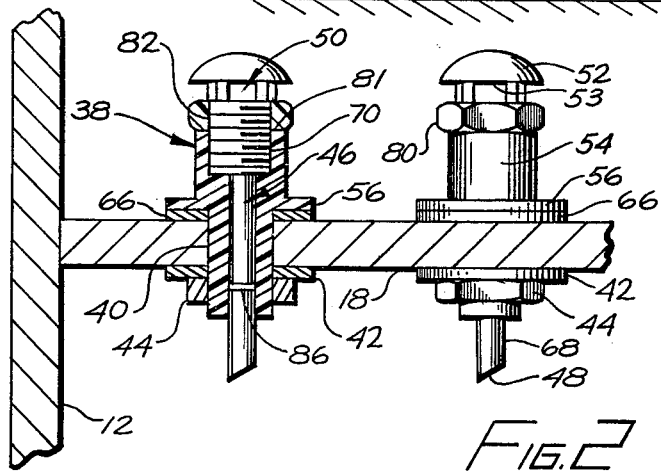
INVENTORS.
RONALD A. LARROWE
THEODORE J. WARNING
BY
Christie, Parker & Hale
ATTORNEYS

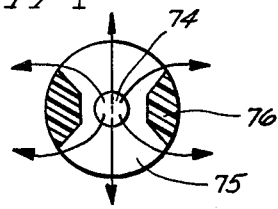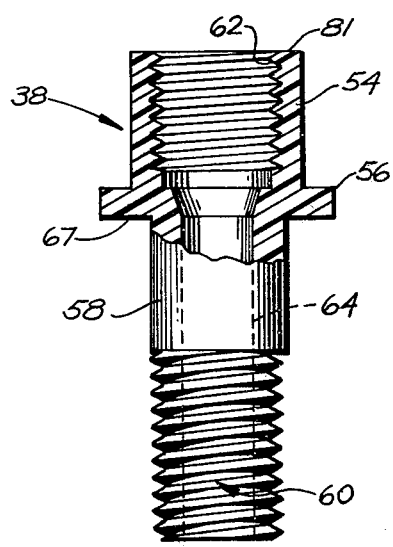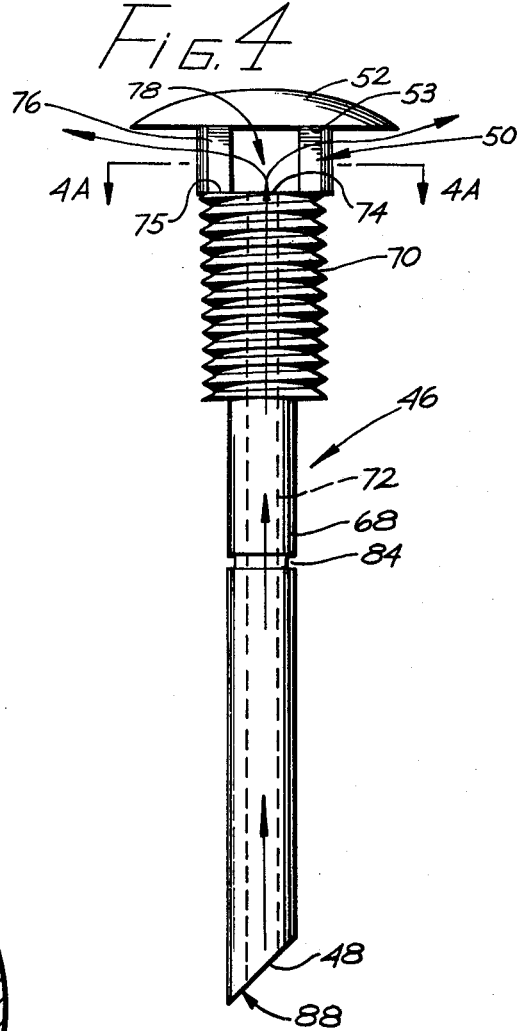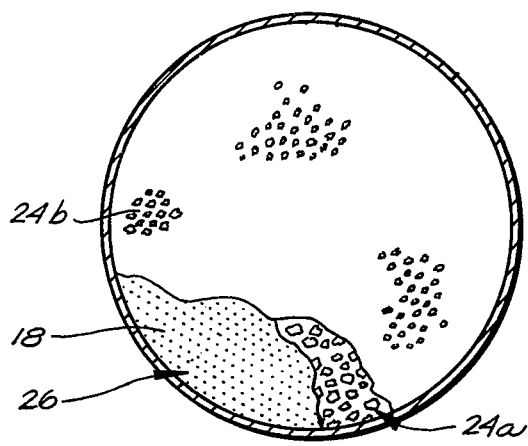

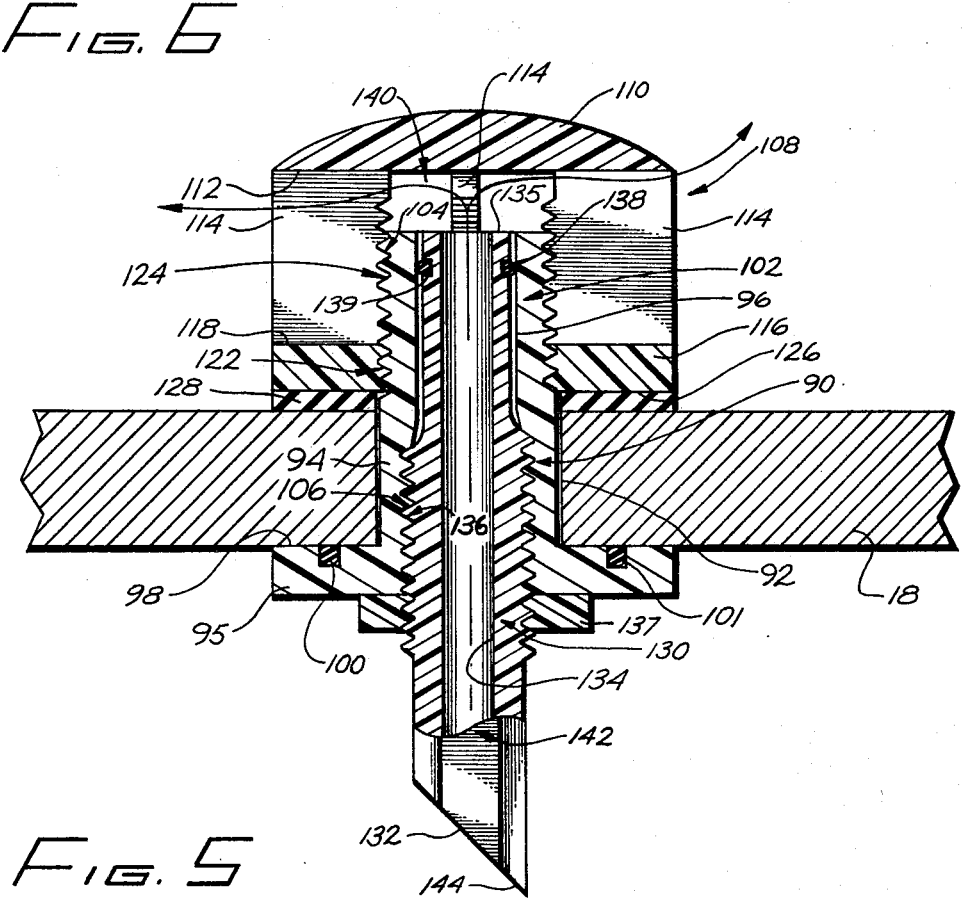
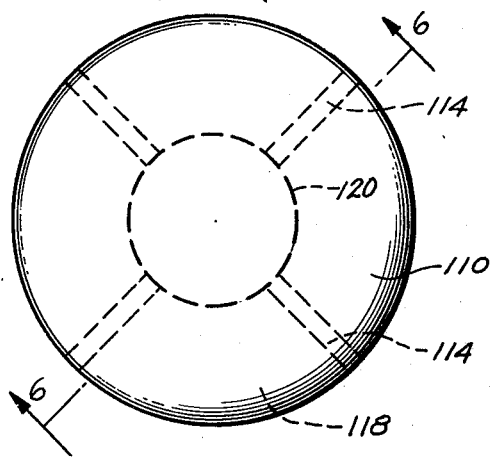

United States Patent Office 3,498,462
Patented Mar. 3, 1970

3,498,462
FLOW NOZZLE ASSEMBLY FOR UPFLOW
FILTERS
Ronald A. Larrowe, Whittier, and Theodore J. Warning, Walnut, Calif., assignors to U.S. Filter Corporation, Whittier, Calif., a corporation of California
Filed May 14, 1969, Ser. No. 824,553
Int. Cl. B01d 35/02, 23/20, 27/02
U.S. Cl. 210—289       18 Claims

ABSTRACT OF THE DISCLOSURE

An upflow filter having a filter bed of granular solids, and a plurality of flow nozzles in a bed plate for delivering unfiltered liquid to the filter bed. In a preferred form of the invention each nozzle has an externally threaded portion engaged with an internally threaded hollow sleeve which is immovably sealed through the bed plate. The threaded sleeve enables the elevation of the nozzles to be equalized and provides a permanent seal which substantially eliminates leakage through the bed plate, thereby producing equal flow distribution of liquid up through the filter bed.

BACKGROUND OF THE INVENTION

Field of the invention

This invention relates to liquid filtration apparatus of the upflow type, and more particularly to a flow nozzle assembly for producing uniform flow distribution of liquid through the filter.

Background of the prior art

Filtration apparatus commonly used to filter liquids includes the "upflow" filter, wherein liquid to be filtered is forced upwardly through a filter bed of granular solids. A typical upflow filter includes an upright cylindrical filtration tank or shell, and a bed plate in the lower part of the shell for supporting the filter bed. The filter bed generally comprises a bottom layer of coarse gravel, an intermediate layer of filter grade gravel, and a relatively large top layer of sand. Unfiltered liquid is forced into the portion of the shell beneath the bed plate for upward passage through the filter bed. A plurality of flow nozzles in the bed plate evenly distributes the liquid to the filter bed, and filtered liquid is withdrawn from the top of the shell.

A frequent difficulty in upflow filters occurs when the upward flow of liquid through the filter bed fluidizes or cracks the bed, causing open channels to extend upwardly through the bed. As a result, the liquid to be filtered flows up through the channels, bypassing the granular filtering solids and thereby avoiding proper filtration. This channeling effect usually occurs when the flow distribution of liquid across the filter bed is not uniform. For example, it has been found that filter bed erosion occurs where the flow of liquid is stronger than in surrounding areas, the uneven flow creating a breakdown in the binding action of the solids in the bed. Uniform flow distribution is produced by equalizing the elevation of the outlet openings in the nozzles in the bed plate, so that each nozzle continuously delivers substantially the same amount of fluid to a particular level in the filter bed.

This invention provides a flow nozzle assembly for upflow filters which enables adjustment of nozzle elevation to achieve even flow across the filter bed. At present, there are upflow filters with vertically adjustable nozzles, but these devices exhibit a number of disadvantages. For example, conventional upflow filters have inlet nozzles which are supported on the top side of the bed plate by a series of removable gaskets. The height of the nozzles is equalized by adding or removing gaskets to raise or lower the elevation of each nozzle. This requires one workman above the bed plate to adjust nozzle height and one workman below the bed plate to tighten a nut which holds the nozzle in place. Typically, the shell is filled with water to a depth necessary to determine whether nozzle height above the bed plate is uniform. If further adjustment is required, the water is drained from above the bed plate, nozzle elevation is reset, and the shell is refilled for redetermining whether nozzle elevation is uniform.

SUMMARY OF THE INVENTION

This invention includes inlet means extending through the bed plate of an upflow filtration apparatus for delivering unfiltered liquid to a filter bed of granular solids. The inlet means includes a hollow threaded sleeve extending through the bed plate. An elongated hollow flow tube having an upper outlet and a threaded portion engageable with the threads of the sleeve is adjustably mounted in the sleeve. The flow tube has a lower inlet extending into a chamber below the bed plate. The elevation of the flow tube outlet is adjustable by relative rotation of the tube and the sleeve. Means are provided for creating a watertight seal between the flow tube and the sleeve to prevent leakage between the members as elevation is adjusted. A watertight seal is also provided between the inlet means and the bed plate to prevent leakage through the bed plate.

This invention contemplates a plurality of inlet means or flow nozzle assemblies in the bed plate of a conventional upflow filter adapted to produce substantially uniform flow across a filter bed during filtration process. Preferably, each flow tube of this invention has substantially the same length so that the elevation of each flow tube outlet and its respective inlet is simultaneously equalized by relative rotation of each flow tube and its respective sleeve. This ensures continuously uniform flow distribution through the flow tubes and through the filter bed.

The flow nozzle assembly of this invention enables the elevation of flow tube outlet openings to be equalized substantially faster and more accurately than in conventional upflow filters. Preferably, the height of an outlet is simply adjusted by screwing its respective flow tube up or down in its sleeve to achieve the proper level. Adjustment is accomplished by a single workman on the top side of the bed plate, as opposed to conventional filters which require two workmen. In addition, this invention enables uniformity of nozzle height to be rapidly achieved by simply filling the shell with water to the desired elevation and adjusting the level of each outlet until all nozzle assemblies are perfectly aligned. This avoids the laborious leveling procedure of conventional filters wherein the shell is alternately filled with water to determine nozzle height, drained for addition or removal of gaskets, and refilled to redetermine uniformity of nozzle height. The advantages of the present invention over prior art devices are particularly manifest when aligning a large number of nozzles in the bed plate of a conventional twelve foot diameter upflow filter. The bed plate in this type of filter is ordinarily slightly uneven, deviating from true horizontal by as much as one-fourth inch in some areas. As a result, the leveling of conventional shim-mounted inlet nozzles is a particularly tedious process, as opposed to the relatively simple task required by the flow nozzle assembly of this invention.

This invention includes a watertight seal between the inlet means and the bed plate to prevent leakage through the bed plate. Preferably, the seal remains stationary once it is installed. In a preferred form of the invention, the sleeve is immovably sealed through the bed plate. As a result of the bed plate seal, this invention is able to overcome another problem characteristic of the vertically adjustable inlet nozzles presently used in conventional upflow filters. For example, if an inlet nozzle assembly is not properly sealed through the bed plate, unfiltered liquid may leak through the bed plate and create uneven flow in the filter bed, thereby causing channeling to occur. Conventional gasket-mounted adjustable nozzles have experienced leakage problems in the past because of the difficulty in simultaneously obtaining uniform nozzle elevation and uniform seal pressure, particularly with an uneven bed plate. Typically, some nozzles are tightened down on their respective gaskets with greater pressure than adjacent nozzles in order to achieve true leveling of all nozzles. As a result, unfiltered liquid leaks through the bed plate around some of the seals and causes channeling in the filter bed. The flow nozzle assembly of this invention enables a single workman to rapidly equalize the elevation of all flow tube outlets regardless of the unevenness of the bed plate, and concurrently provides constant seal pressure across the bed plate to prevent leakage which could otherwise result in destructive channeling.

The structure of the flow nozzle assembly of this invention permits ease of replacement in the event the nozzle assembly becomes damaged during the loading of the first granular layer. The surfaces of the bed plate are sometimes provided with a heavy corrosion-resistant lining of stainless steel or rubber depending upon the type of liquid being filtered. This invention is adapted to fit varying bed plate thicknesses to permit use of the same flow nozzle assembly whether or not a heavy bed plate lining is used.

A further problem with conventional flow nozzles is their inability to be easily adjusted after a heavy filter bed is placed in the shell. This problem becomes particularly acute in applications where a large sand filter is supported on a foundation which is likely to settle, or where shock or vibration may knock the entire filter shell out of alignment. In the event the filter shell and bed plate deviate from true horizontal alignment after the filter bed is placed in the shell, it is often a simpler task to realign the elevations of the nozzles rather than adjusting the alignment of the shell. This invention provides a flow nozzle assembly structure which enables the elevation of the flow tube outlet to be adjusted from the bottom side of the bed plate after a filter bed is installed in the shell.

BRIEF DESCRIPTION OF THE DRAWINGS

FIG. 1 is a schematic elevational view partly broken away, showing the flow nozzle assembly of this invention in use in a typical upflow filter;

FIG. 1A is a plan elevational view taken on line 1A—1A of FIG. 1;

FIG. 2 is an enlarged elevational view, partially in section, showing a preferred form of the flow nozzle assemblies located within line 2—2 of FIG. 1;

FIG. 3 is an elevational view, partly in section, showing the sleeve portion of the nozzle assembly of FIG. 2;

FIG. 4 is an elevational view showing the flow tube portion of the nozzle assembly of FIG. 2;

FIG. 4A is a plan elevational view taken on line 4A—4A of FIG. 4;

FIG. 5 is a plan elevational view of an alternate embodiment of this invention; and FIG. 6 is a side elevational sectional view taken on line 6—6 of FIG. 5.

DESCRIPTION OF THE PREFERRED EMBODIMENT

Referring to the drawings, a typical upflow filter 10 includes a vertically oriented, substantially cylindrical filtration tank or shell 12. An elongated inlet pipe 14 extending outwardly from an inlet port 16 at the bottom of the shell is adapted to receive a supply of liquid to be filtered. A substantially circular bed plate 18 disposed in the lower part of the shell abuts against the inner wall of the shell about its perimeter to form an enclosed chamber 20 in the lower interior portion of the shell. Unfiltered liquid introduced into the shell through inlet pipe 14 is forced into the chamber where it is diffused by a baffle 22 disposed adjacent inlet port 16 inside the shell.

Bed plate 18 supports a filter bed 24 of granular solids which fill a substantial portion of the interior of the shell. The filter bed preferably comprises successive layers of material having particle sizes which progressively decrease with elevation above the bed plate. Thus, a layer of coarse gravel or rock forms a bottom layer 24a of the filter bed, a layer of finer grade material gravel forms an intermediate layer 24b, and a relatively large top layer 24c is comprised of sand. A vertically adjustable flow nozzle assembly 26 of this invention extends through the bed plate and is adapted to deliver unfiltered liquid from chamber 20 to the filter bed. Preferably, a plurality of evenly spaced-apart flow nozzles are disposed in the bed plate in a diamond pattern such as that shown in FIG. 1A to ensure even flow distribution of liquid entering the filter bed. The liquid to be filtered is forced upwardly through the filter bed and subjected to the filtering action of the granular solids in the bed. Filtered liquid 28 accumulates above an upper level 30 of the filter bed and is withdrawn from the shell by an upwardly diverging outlet funnel 32 which collects filtered liquid for removal through an elongated elbow-shaped outlet pipe 34. The outlet pipe is joined to the bottom of funnel 32 inside the shell and extends outwardly through the wall of the shell and downwardly adjacent the exterior wall of the shell where it terminates in an opening 36 adapted to be coupled to a delivery line (not shown).

A preferred adjustable flow nozzle assembly according to this invention is shown in FIG. 2. The nozzle assembly includes a hollow sleeve 38 permanently sealed in a bore 40 which extends through bed plate 18. The lower portion of the sleeve is fastened to the bed plate by a washer 42 and a sleeve jam nut 44 tightened against the underside of the bed plate. An elongated hollow flow tube 46 is inserted through the sleeve so that an opening 48 in its lower end opens into cavity 20. The upper portion of the flow tube opens into a flow nozzle means 50 which controls the directional flow of liquid which is forced upward through the flow tube. The nozzle has a round cap 52 with a flat bottom surface 53 and an arcuate upper surface. The cap assists in distributing flow to the filter bed and prevents the granular solids of the bed from plugging the nozzle.

Sleeve 38 comprise a hollow, elongated tube-like member defining a stub sleeve 54 projecting upwardly from a circular flange 56 which encompasses the outer periphery of the sleeve. An elongated stem portion 58 projects downwardly from the flange and has a diameter less than that of the stub sleeve. A series of threads 60 encompass approximately the lower half of the stem. The threads are adapted to engage the internally threaded portion of sleeve jam nut 44 which tightens sleeve 38 in place on the bottom side of the bed plate. A stepped bore extends axially through the sleeve and defines an upper threaded bore 62 substantially equal in length to the stub sleeve, and a constricted, elongated straight bore 64 is coextensive with the remaining lower portion of the sleeve.

In use, the sleeve is inserted through a soft rubber gasket 66 mounted on the upper surface of the bed plate and extended downwardly into bore 40 so that a lower bearing surface 67 defined by flange 56 abuts against the upper surface of the gasket. The sleeve is immovably sealed into the bed plate by the gasket when sleeve jam nut 44 is tightened against the lower surface of the bed plate. Each sleeve jam nut used in the filter is tightened with substantially the same amount of torque to provide uniform seal pressure across the bed plate. The seal pressure produced is sufficient to prevent liquid from leaking upward through bore 40, and once the sleeves are seated they no longer require adjustment.

Flow tube 46 defines a narrow, elongated, transversely circular lower stem 68, and externally threaded, transversely circular intermediate shank 70 having a diameter larger than that of the lower stem, and nozzle 50 integral with the top of the shank. A straight bore 72 extends axially through the flow tube and defines inlet opening 48 at the bottom of the tube and an outlet opening 74 in an upper end surface 75 of shank 70. Nozzle 50 comprises a pair of short, vertically oriented side members 76 projecting upwardly from shank 70 and covered by cap 52. The nozzle defines a transverse orifice 78 coextensive in length with the width of the shank. The direction of flow through the orifice is illustrated by the arrows in FIG. 4A.

The flow tube is assembled for operation by initially mounting a flow tube jam nut 80 on an upper bearing surface 81 defined by stub sleeve 54. The flow tube jam has an internally threaded bore 82 equal in diameter to the internally threaded bore of the stub sleeve. Flow tube jam nut 80 is concentrically aligned with the stub sleeve, and its threads are adapted to engage the threaded portion of the shank. The stem portion of the flow tube is then inserted into bore 82 of jam nut 80 and extended down through the longitudinal bore defined by jam nut 80 and sleeve 38. The threads of shank 70 are engaged with the threads of the jam nut and the stub sleeve, and elevation of the flow tube outlet is adjusted by screwing the flow tube up or down relative to the stationary sleeve. Preferably, the elevation of a plurality of flow nozzles is equalized by initially filling the shell with water to the desired level above the bed plate. Each flow tube is then screwed up or down in the sleeve to align bottom surface 53 of the caps with the upper level of the water. Alternately, upper surface 75 of shank 70 can be used for alignment with the upper elevel of the water. After proper elevation of each outlet is determined, each flow tube is locked in its respective sleeve by tightening jam nut 80 against the upper surface of the stub sleeve to provide an axial holding force on the flow tube. The flow tubes preferably have uniform length so that proper alignment of nozzle height simultaneously equalizes the elevation of lower stem openings 48. It is necessary to align these openings to produce uniform fluid flow into the filter bed. The flow nozzle assembly of this invention is preferably constructed of a durable, corrosion-resistant plastic material capable of withstanding large externally applied pressures and suitable for injection molding of parts.

During the filtration process, liquid is forced upward through the longitudinal bore in the flow tube and out opening 74 in the flow tube as shown by the arrows in FIG. 4. A transverse recess 84 encompasses the outer periphery of stem 68 of the flow tube, and an O-ring 86 is seated in the recess. In use, the O-ring provides a watertight seal between stem 68 and bore 64 of sleeve 38 to prevent liquid from leaking upward between the two members. Stem 68 is provided with a beveled bottom edge surface 88 so that lower opening 48 has an elliptical cross-sectional configuration. The opening thus formed is oblique to the level of the liquid introduced into chamber 20, and this configuration provides superior inlet capabilities because it avoids the capillary action characteristic of an opening parallel to the level of a rising body of liquid. The elliptical opening is additionally useful as an alternate means of aligning the elevation of the nozzles from below the bed plate. That is, the apexes of the openings can be readily aligned with the upper surface of the leveling fluid in the lower portion of the shell.

FIGURES 5 and 6 show an alternate embodiment of this invention which includes a hollow sleeve 90 extending through a bore 92 in bed plate 18. The sleeve comprises a hollow, elongated tubular member 94 having a circular flange 95 encompassing its outer periphery at one end and an elongated concentric bore 96. In use, the sleeve is adapted to be extended upwardly through bore 92 so that an upper bearing surface 98 defined by flange 95 abuts against the bottom surface of the bed plate. A circular recess 100 is disposed in bearing surface 98 concentric of bore 95 and a circular O-ring 101 inserted in the recess is adapted to provide a watertight seal when surface 98 abuts against the lower surface of the bed plate. An upper section 102 of sleeve 90 is adapted to project above the upper surface of the bed plate when the sleeve is mounted in position in the bed plate bore 92. A series of threads 104 encompass the outer peripheral surface of sleeve section 102, and a further series of threads 106 encompass the inner surface of sleeve bore 96 upwardly from the bottom of the sleeve concentric of flange 95 to approximately the mid-point of the bore.

Sleeve 90 is held in position in the bed plate by a cap nut 108 defining a round upper cap 110 with a flat bottom surface 112 and an arcuate upper surface, four equally spaced upright ribs 114 integral with bottom surface 112, and a flat, substantially circular annular bearing member 116 having an upper surface 118 integral with the bottom of ribs 114. Cap nut bearing member 116 has a central bore 120 with a series of threads 122 adapted to engage outer threads 104 of sleeve section 102. The upright inner surfaces of ribs 114 are concentric of bearing member bore 120 and are provided with a series of threads 124 likewise adapted to engage threads 104 of sleeve section 102. In use, cap nut 108 holds sleeve 90 permanently in position in the bed plate by engagement of the threads of the cap nut with threads 104 of sleeve section 102, and tightening of the cap nut down on the sleeve so that lower bearing surface 126 of bearing member 116 abuts against the upper surface of the bed plate. A resilient annular gasket 128 can be mounted on the bed plate for engagement with bearing surface 126, if desired.

An elongated, hollow flow tube 130 is adapted to be adjustably mounted in the bore of sleeve 90 so that an inlet opening 132 in its bottom end extends into cavity 20 in the lower part of the shell. The flow tube has an elongated concentric bore 134 defining an upper outlet opening 135 and a series of threads 136 encompassing an intermediate portion of its outer surface. Threads 136 are adapted to be engaged with threads 106 on the inner surface of sleeve bore 92 so that the elevation of outlet 134 can be adjusted by rotating the flow tube relative to the sleeve. A lock nut 137 is engaged with the threads of the flow tube extending downwardly below sleeve flange 95. After nozzle height is set, the flow tube is tightened in place in the sleeve by tightening lock nut 137 against the bottom surface of sleeve flange 95. A circular O-ring 138 is disposed in a recess 139 encompassing the outer perimeter of the upper portion of the flow tube. The O-ring provides a watertight seal between the flow tube and the sleeve to prevent leakage through the nozzle means into the filter bed. When the flow tube is mounted in the sleeve, cap nut 108 provides a nozzle opening 140 above flow tube outlet 135. Flow through the nozzle assembly is shown by the arrows in FIG. 6. This embodiment of the invention is particularly useful enabling the elevation of outlet 135 to be adjusted from the bottom side of the bed plate after a filter bed has been placed in the shell. Outer peripheral surface 142 of the lower portion of the flow tube is preferably hexagonal in transverse cross-section to facilitate engagement with a wrench or the like from the bottom side of the bed plate. Thus, flow nozzle elevation is easily equalized irrespective of the pressure exerted on the upper surface of the bed plate. Preferably, a lower end surface 144 of the flow tube at inlet opening 132 is beveled to facilitate ease of alignment of a plurality of flow nozzles in a manner heretofore described.

What is claimed is:

1. A liquid filtration apparatus of the upflow type comprising:

(a) a shell;

(b) a bed plate disposed in the lower portion of the shell for supporting a filter bed of granular solids, the bed plate cooperating with the interior of the shell to define a chamber in the lower portion of the shell;
(c) means for forcing liquid to be filtered into the chamber;
(d) inlet means extending through the bed plate for delivering the liquid to the filter bed, the inlet means comprising:
  (1) a hollow sleeve extending through the bed plate and having a threaded portion;
  (2) an elongated hollow flow tube adjustably mounted in the sleeve with an inlet extending into the chamber below the bed plate, the flow tube having an outlet above the inlet and a threaded portion engageable with the threads of the sleeve, the threads of the flow tube and sleeve facilitating adjustment of the elevation of the flow tube outlet by relative rotation of the flow tube and the sleeve; and
  (3) means providing a watertight seal between the flow tube and the sleeve to prevent leakage between them as elevation is adjusted; and
(e) means providing a watertight seal between the inlet means and the bed plate to prevent leakage through the bed plate.

2. Apparatus according to claim 1 wherein the inlet means further includes nozzle means above the flow tube outlet for controlling the direction of flow into the filter bed.

3. Apparatus according to claim 1 including fastening means adapted to prevent relative rotation of the sleeve and the flow tube after the elevation of the flow tube outlet is adjusted.

4. Apparatus according to claim 1 including an O-ring secured to the outer surface of the flow tube to provide the watertight seal between the tube and the sleeve.

5. Apparatus according to claim 1 wherein the lower portion of the flow tube extending below the bed plate has a hexagonal outer surface to facilitate engagement with torque-receiving means for adjusting the elevation of the flow tube outlet from the bottom side of the bed plate.

6. Apparatus according to claim 3 wherein:
(a) the sleeve has an internally threaded portion;
(b) the flow tube has an externally threaded portion engageable with the internally threaded portion of the sleeve; and
(c) the fastening means comprises a flow tube lock nut mounted on the top of the sleeve and having an internally threaded bore equal in diameter to the internally threaded portion of the sleeve, whereby the threads of the flow tube are adapted for engagement with the threaded portions of the flow tube lock nut and the sleeve, the flow tube being fastened in place in the sleeve by tightening of the flow tube lock nut against the top of the sleeve.

7. Apparatus according to claim 1 wherein the seal between the inlet means and the bed plate is formed by:
(a) a resilient annular gasket disposed on the bed plate around the sleeve;
(b) a flange encompassing the outer perimeter of the sleeve adapted to abut against the top of the gasket; and
(c) a sleeve lock nut engaged with an externally threaded lower portion of the sleeve below the bed plate, whereby the sleeve is immovably sealed into the bed plate by tightening of the sleeve lock nut against the bottom of the bed plate.

8. Apparatus according to claim 1 wherein the flow tube has an externally threaded intermediate portion below its outlet for engagement with the threads of the sleeve, and a non-threaded lower stem portion sealed to the inner wall of the sleeve and extending into the chamber below the bed plate.

9. Apparatus according to claim 8 wherein the sleeve has an internally threaded upper bore adapted to engage the externally threaded portion of the flow tube, and a lower straight bore sealed to the lower stem of the flow tube.

10. Apparatus according to claim 9 wherein an O-ring encompasses the lower stem of the flow tube to provide a watertight seal against the non-threaded bore of the sleeve.

11. Apparatus according to claim 2 wherein:
(a) the sleeve has an internally threaded portion and an externally threaded portion above the bed plate;
(b) the flow tube has an externally threaded portion adapted to engage the internally threaded portion of the sleeve; and
(c) the nozzle means has an internally threaded portion adapted to engage the externally threaded portion of the sleeve, whereby the nozzle means is adapted to be fitted over the upper portion of the sleeve above the flow tube outlet to provide a nozzle opening above the said outlet, and to enable adjustment of flow tube outlet elevation from the bottom side of the bed plate after a filter bed is disposed in the shell.

12. Apparatus according to claim 11 wherein the nozzle means comprises:
(a) an upper cap;
(b) a plurality of upright ribs integral with the bottom surface of the cap, the ribs having an internallly threaded portion adapted for engagement with the threads of the sleeve; and
(c) a lower annular bearing member having an upper surface integral with the bottom of the ribs, an internally threaded bore adapted for engagement with the threads of the sleeve, and a lower bearing surface adapted to abut against the upper surface of the bed plate.

13. Apparatus according to claim 3 wherein the fastening means comprises a flow tube lock nut below the bed plate having an internally threaded bore equal in diameter to the internally threaded portion of the sleeve, whereby the threads of the flow tube are adapted for engagement with the internally threaded portions of the flow tube lock nut and the sleeve, the flow tube being fastened in place in the sleeve by tightening of the flow tube lock nut against he bottom surface of the sleeve.

14. Apparatus according to claim 11 wherein a flow tube O-ring is secured to the outer surface of the flow tube to provide the said watertight seal between the tube and the sleeve.

15. Apparatus according to claim 11 wherein the seal between the inlet means and the bed plate is formed by:
(a) a flange encompassing the outer perimeter of the sleeve having a bearing surface adapted to abut against the bottom surface of the bed plate;
(b) a substantially circular recess in the bearing surface of the sleeve flange; and
(c) a bed plate O-ring seated in the said recess adapted to provide a watertight seal between the bottom surface of the bed plate and the bearing surface of the sleeve when the sleeve flange abuts against the bed plate.

16. A liquid filtration apparatus of the upflow type comprising:
(a) a shell;
(b) a bed plate disposed in the lower portion of the shell for supporting a filter bed of granular solids, the bed plate cooperating with the interior of the shell to define a chamber in the lower portion of the shell;
(c) means for forcing liquid to be filtered into the chamber;
(d) a plurality of inlet means extending through the bed plate for delivering the liquid to the filter bed such that the flow into the filter bed through each inlet means is substantially identical during the filtration process, each inlet means comprising:
  (1) a hollow sleeve extending through the bed plate and having a threaded portion;
  (2) an elongated hollow flow tube adjustably mounted in the sleeve with an inlet extending into the chamber below the bed plate, the flow tube having an outlet above the inlet and a threaded portion engageable with the threads of the sleeve, the threads of the flow tube and sleeve facilitating adjustment of the elevation of the flow tube outlet by relative rotation of the flow tube and the sleeve; and
  (3) means providing a watertight seal between the flow tube and the sleeve to prevent leakage between them as elevation is adjusted; and
(e) means providing a watertight seal between each inlet means and the bed plate to prevent leakage through the bed plate.

17. Apparatus according to claim 16 wherein the length of each flow tube is substantially identical to facilitate adjustment of the flow tube outlets from the bottom side of the bed plate.

18. Apparatus according to claim 16 wherein the lower end of each flow tube has an oblique surface with reference to the level of the liquid in the filter to provide efficient inlet flow of liquid into the flow tubes and to facilitate ease of adjustment of flow tube elevation from the bottom side of the bed plate.

References Cited

UNITED STATES PATENTS

| 2,711,829 | 6/1955 | Hulsbergen | 210—292 |
| 2,886,177 | 5/1959 | Prescott | 210—292 |

FOREIGN PATENTS

| 1,013,722 | 5/1952 | France. |

SAMIH N. ZAHARNA, Primary Examiner

U.S. Cl. X.R.

210—292, 293